United States Patent [19]
Lynch

[11] 3,748,710
[45] July 31, 1973

[54] TOOL BIT HOLDER
[76] Inventor: Frank T. Lynch, 7471 Bear Ridge Rd., North Tonawanda, N.Y. 14120
[22] Filed: Sept. 20, 1971
[21] Appl. No.: 181,811

[52] U.S. Cl. ............................................. 29/96 R
[51] Int. Cl. .............................................. B26d 1/00
[58] Field of Search .................. 29/95, 96, 95 A, 29/95 B, 95 C, 105; 143/148, 149, 153

[56] References Cited
UNITED STATES PATENTS
1,843,549  2/1932  Firth ................................. 29/96 X
622,625    4/1899  Hill .................................... 29/96
2,037,642  4/1936  Scribner ............................ 29/105
1,865,148  6/1932  Slade ................................. 29/95 B FOREIGN PATENTS OR APPLICATIONS
410,963    5/1934  Great Britain ..................... 29/96
667,160    2/1952  Great Britain ..................... 29/96

Primary Examiner—Harrison L. Hinson
Attorney—Carlton Hill, J. Arthur Gross et al.

[57] ABSTRACT

This invention provides a holder for throw-away carbide tool bits useful for machining operations including cut-off, turning, facing, boring and the like. The holder comprises: an elongated shank; and a generally axially extending reentrant slot recessed in a surface of the shank, the slot having side edges tapered outwardly from the outer to the inner part of the slot, whereby a tool bit having corresponding tapered edges can be removably inserted into the slot.

8 Claims, 7 Drawing Figures

PATENTED JUL 31 1973 3,748,710
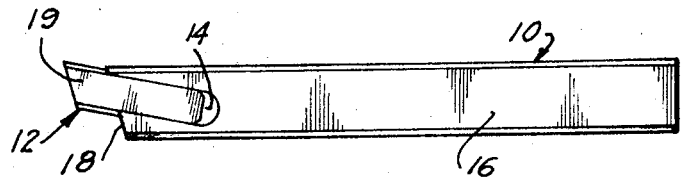
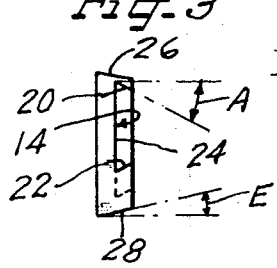
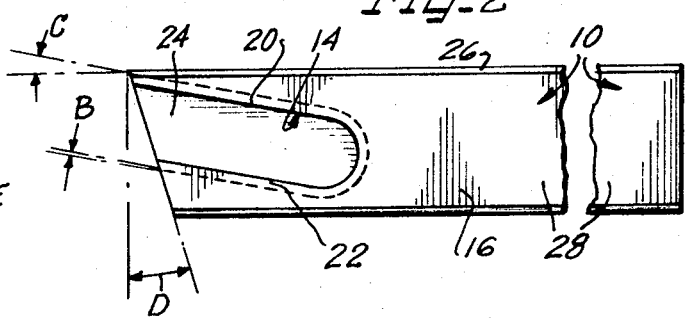
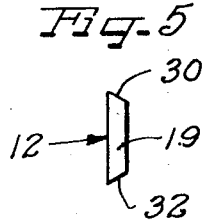
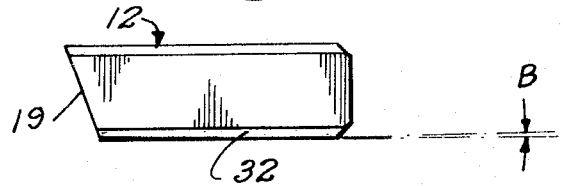
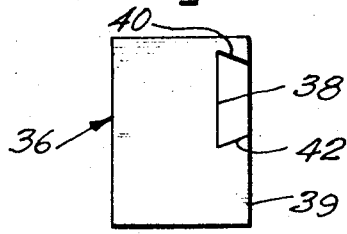
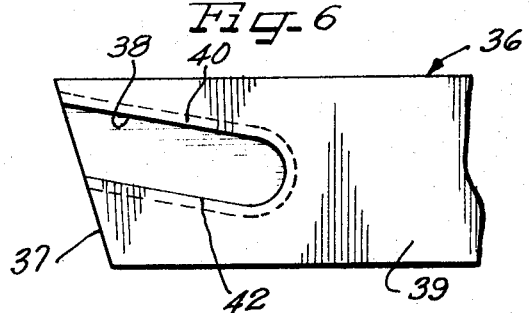
INVENTOR
Frank T. Lynch
ATTORNEYS

TOOL BIT HOLDER

BACKGROUND OF THE INVENTION

This invention relates to a holder for throw-away carbide tool bits useful for cut-off, turning, facing, boring and the like machining operations.

There are many types of holders for throw-away carbide tool bits used for the various types of machining operations. Generally, these holders are formed by a brazing operation which, as well as requiring additional work deteriorates the carbide tool bits and distorts the steel shank holder so that after any length of use the shank will not securely hold and support the carbide tool bits. Also, most other existing tool bit holders require screws, clamps or other means for securing and maintaining the tool bit within them. The screws and clamps are not only an additional expense but something else that can become loose and have to be replaced.

In view of the disadvantages of the existing tool bit holders, there is a need for a holder which will facilitate the various types of tool bits, and which will not become distorted nor tend to deteriorate the tool bit inserted therein. Such a holder would also have to be designed to faciliate these many types of tool bits in locations where the present tool bit holders cannot be utilized. This is particularly true of an indexing holder which because of its bulkiness cannot be used in narrow places.

SUMMARY OF THE INVENTION

I have, accordingly, developed a new and improved holder for throw-away carbide tool bits in which the tool bits can be removably inserted and positively secured during use. The holder according to the present invention comprises an elongated shank and a generally axially extending reentrant slot recessed in a surface of the shank, the slot having side edges tapered outwardly from the outer to the inner part of the slot, whereby a tool bit having corresponding tapered edges can be removably inserted into the slot.

Accordingly, it is an object of the present invention to provide a tool bit holder which can be used to facilitate various carbide tool bits useful for machining operations including cut-off, facing, turning, boring and the like.

A more specific object of the present invention is to provide a tool bit holder having means whereby a tool bit can be removably inserted therein, and positively secured during use for a substantially long period of time.

Other objects, features and advantages of the invention will be readily apparent from the following description of the preferred embodiments thereof, taken in conjunction with the accompanying drawings although variations and modifications may be effected without departing from the spirit and scope of the novel concepts of the disclosure as specifically defined in the appended claims.

BRIEF DESCRIPTION OF THE DRAWINGS

FIG. 1 is a side elevational view of a tool bit inserted in a holder embodying the present invention;

FIG. 2 is a side elevational view of the holder shown in FIG. 1;

FIG. 3 is an end elevational view of the holder illustrated in FIG. 2;

FIG. 4 is a side elevational view of the tool bit illustrated in FIG. 1;

FIG. 5 is an end elevational view of the tool bit shown in FIG. 4;

FIG. 6 is a side elevational view of another embodiment of the holder of the present invention; and FIG. 7 is an end elevational view of the holder illustrated in FIG. 6.

DESCRIPTION OF THE PREFERRED EMBODIMENTS

Referring initially to FIG. 1, a tool holder 10 embodying the present invention is shown with a tool bit 12 removably inserted in a slot 14 recessed in the surface 16 of the holder 10. The holder 10 is an elongated shank having a diagonal end 18. The tool bit 12 is longer in length than the slot 14 to provide a working or cutting end 19.

As illustrated in FIGS. 2 and 3, the slot 14 is a reentrant slot extending generally axially from the diagonal end 18, inwardly along a part of the length of the shank 10. The reentrant slot 14 is open to the longitudinal side or surface 16 of the holder 10 and is accessible from the diagonal end 18 thereof. As particularly shown in FIG. 3, the axial slot 14 has side edges 20 and 22 which are tapered outwardly from the outer part of the slot or surface 16 of the shank 10 to the inner part or bottom 24 of the recessed slot 14. The side edges 20 and 22 are tapered at an angle "A" of between about 20° and about 30°.

The side edges 20 and 22, as illustrated in FIG. 2, are also longitudinally tapered from the diagonal end 18, inwardly, at an angle "B" of between about 1° and about 2°. In addition, the slot 14 is positioned in the surface 16 of the shank 10 such that the side edges 20 and 22 are respectively arranged at an angle "C" of about 10° with the adjacent side edges 26 and 28 of the shank 10.

The slot 14 is recessed in the surface 16 between about ¼ and about ½ the thickness of the shank 10. The recession of the slot depends upon the thickness of the tool bit to be inserted therein.

As shown in FIGS. 2 and 3, the diagonal end 18 of the shank 10 is cut at an angle "D" of about 15°, and the side edges 26 and 28 of the shank are tapered outwardly at an angle "E" of about 10°.

Referring to FIGS. 4 and 5, a tool insert 12 is illustrated which has outwardly tapered edges 30 and 32 which correspond to the tapered edges of the slot 14. Accordingly, the edges 30 and 32 are tapered at an angle of between about 20° and about 30°, and preferably at the same angle as the edges 20 and 22 of the slot 14. Also, as shown in FIG. 4, the edges 30 and 32 are longitudinally tapered at an angle "B" of between about 1° and about 2°, and preferably at an angle slightly greater than the tapered angle of the slot 14 to insure a good contact of the entry end of the tool bit 12. The width and thickness of the insert tool 12 should correspond with the width and recession of the slot 14. Accordingly, however, the width of the insert tool 12 should be a little less than the width of the slot 14 so as to allow sufficient space to insert the tool into the slot 14. With this arrangement, the insert tool 12 can be inserted and securely installed in the slot 14.

In FIGS. 6 and 7, there is illustrated another embodiment of the present tool bit holder. The holder 36 is an elongated shank having a diagonal end 37 and a rectangular cross section, as shown in FIG. 7. In comparison with the holder 10 illustrated in FIGS. 1 to 3, the holder 36 has a greater width and thickness. The holder 36 is particularly useful for wider tool bits such as wider cut-off, turning and boring bits. A slot 38 formed in the surface 39 of the shank 36 is accordingly wider and recessed further in the surface of the shank than the slot 14 formed in the surface 16 of the holder 10. The side edges 40 and 42 of the slot 38 are tapered at an angle similar to that of the side edges 20 and 22 of the slot 14 of between about 20° and 30°. The other dimensions of the holder 36 and slot 38 are similar to the respective dimensions of the holder 10 and slot 14.

In utilizing both embodiments of the tool bit holder illustrated in the drawings and described above, a tool bit is merely slid into the slot formed in a surface of the holder, and by the manner in which the edges of both the slot and tool bit are tapered, the tool bit is positively secured therein.

An important feature of the present holder is when any pressure is applied to a tool during any of the various machining operations, the slot will not become distorted and allow the tool bit to move laterally and become dislodged.

It is apparent from the above description that a holder is provided for various throw-away carbide tool bits, in which holder a tool bit can be removably inserted and secured therein during use without deterioration of the tool bit and without the need of any screws, clamps or the like.

I claim as my invention:

1. A holder for throw-away carbide tool bits, said holder comprising: an elongated shank, and a generally axially extending reentrant slot recessed in a longitudinal side surface of said shank and open to one end of said shank, said slot having side edges tapered outwardly from the outer to the inner part of said slot and also being longitudinally tapered inwardly from said one end, whereby a tool bit having corresponding tapered edges can be removably inserted into said slot.

2. A holder according to claim 1, wherein the side edges of said slot are longitudinally tapered inwardly from said end of said shank at an angle of between about 1° and about 2°.

3. A holder according to claim 1, wherein the side edges of said slot are outwardly tapered at an angle of between about 20° and 30°.

4. A holder according to claim 1, wherein said slot is recessed in said surface of said shank between about ¼ and about ½ the thickness of said shank.

5. A holder according to claim 1, wherein the side edges of said slot are respectively arranged at an angle of about 10° with the adjacent side edges of said shank.

6. A holder for throw-away carbide tool bits, said holder comprising: an elongated shank having a diagonal end, and a generally axially extending reentrant slot recessed in a surface of said shank and open to said diagonal end, said slot having side edges tapered outwardly from the outer to the inner part of said slot at an angle of between about 20° and about 30° and also longitudinally tapered inwardly from said diagonal end, whereby a tool bit having corresponding tapered edges can be removably inserted into said slot.

7. A holder according to claim 6, wherein said side edges of said slot are longitudinally tapered inwardly from said diagonal end at an angle of between about 1° and about 2°.

8. A holder according to claim 6, wherein said slot is recessed in said surface of said shank between about ¼ and about ½ the thickness of said shank.

* * * * *